UNITED STATES PATENT OFFICE.

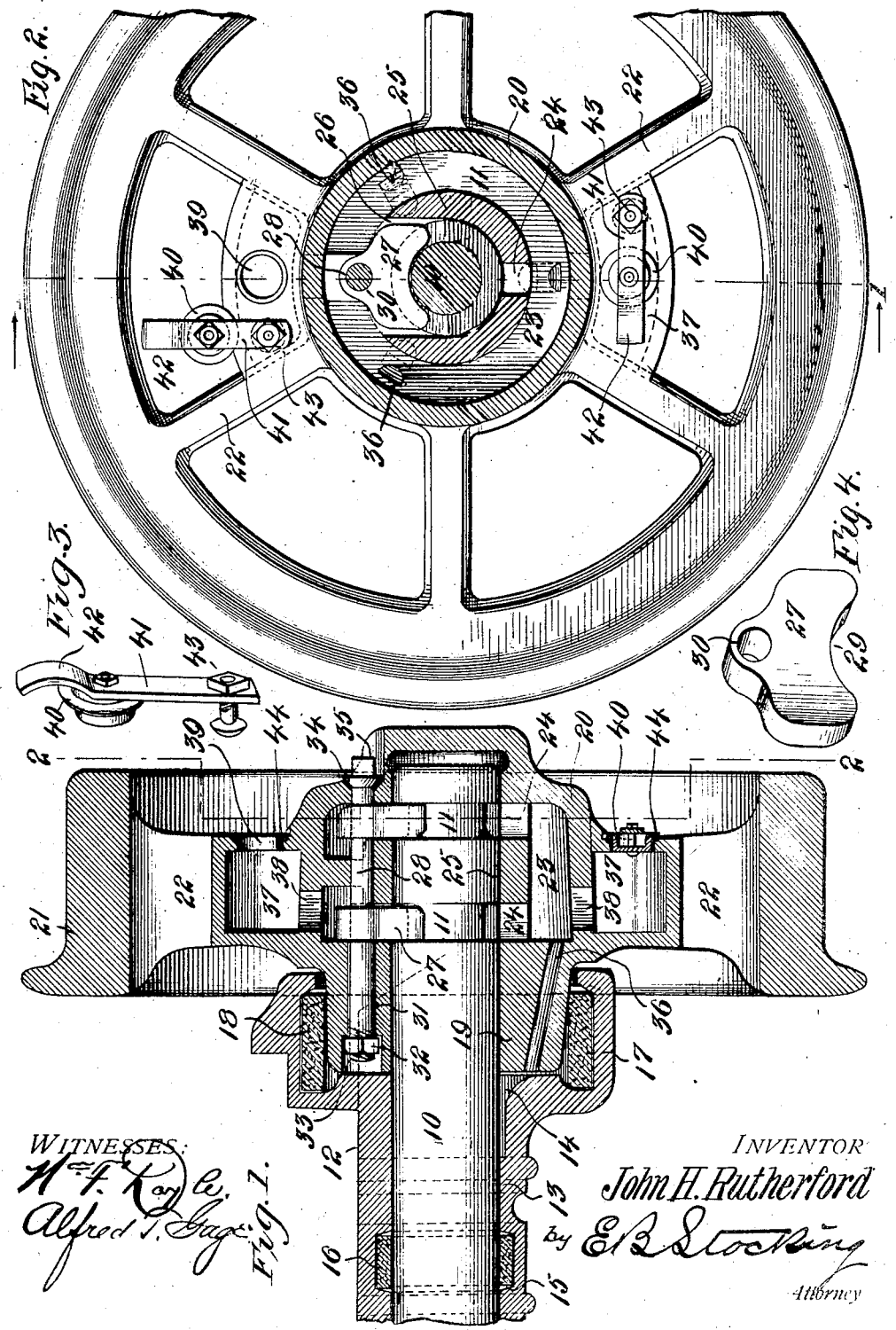

JOHN H. RUTHERFORD, OF KNOXVILLE, TENNESSEE, ASSIGNOR OF ONE-HALF TO ASA W. WHITNEY, OF KNOXVILLE, TENNESSEE.

LUBRICATING DEVICE.

No. 903,786.      Specification of Letters Patent.      Patented Nov. 10, 1908.

Application filed November 22, 1907. Serial No. 403,374.

*To all whom it may concern:*

Be it known that I, JOHN H. RUTHERFORD, a citizen of the United States, residing at Knoxville, county of Knox, and State of Tennessee, have invented certain new and useful Improvements in Lubricating Devices, of which the following is a specification, reference being had therein to the accompanying drawing.

This invention relates to a lubricating device, and particularly to means for securing the wheel to the axle to permit free rotation thereon and lubricate the bearings thereof.

An object of the invention is to provide a novel and improved arrangement of lubricating chamber and ducts whereby both the wheel hub and the bearing in the pedestal are lubricated.

Other and further objects and advantages of the invention will be hereinafter fully set forth and the novel features thereof defined by the appended claims.

In the drawing:—Figure 1 is a vertical section on the line 1—1, Fig. 2; Fig. 2 is a similar view on the line 2—2, Fig. 1; Fig. 3 is a detail perspective of the spring for the oil cup caps, and Fig. 4 is a similar view of one of the locking keys.

Like numerals refer to like parts in the several figures of the drawing.

The numeral 10 designates the axle which may be of any desired size or configuration and is provided with a plurality of circumferential grooves 11 at its outer end. This axle is mounted in the pedestal 12 which is secured in the usual manner to the frame of the car or vehicle upon which the wheel is to be applied. The pedestal is provided with the bearing portion 13 and the cut-away portion 14 extending therefrom toward the outer end of the axle. The inner end of the pedestal is formed with a seat 15 adapted to receive the felt packing 16 to prevent the escape of oil therefrom. The outer end of the pedestal is provided with the enlarged chamber 17 within which the felt or fibrous packing 18 is disposed, and within this packing the extension 19 from the wheel hub 20 projects.

The wheel 21 is formed with the usual spokes or arms 22 extending from the hub 20 thereof, and this hub is provided with the oil chamber 23 having extending therefrom the passages 24 which communicate with the grooved portions 11 of the axle and with the bearing surface 25 of the hub. This bearing surface is open or cut away at the portion 26 opposite the grooves 11 of the axle 10, and extending through the portion 26 is the key 27 which is mounted upon a bolt 28. A plurality of these keys are used, as shown in Fig. 2, so as to resist the end strain and to provide a secure locking with the minimum depth of groove in the axle so as to prevent weakening the axle by a deep cut groove. The keys 27, as shown in Fig. 4, are provided with a face 29 curved to correspond with the axle face and are supported out of contact with this face so as to avoid wear incident to frictional contact between these parts. The key is also provided with the eye 30 to receive the bolt 28 before described. This bolt passes through the wheel hub in the passage 31 provided for that purpose and has a nut 32 disposed upon its inner end and within a recess 33 of the hub extension 19. The opposite end or head of the bolt is in contact with the packing or gasket 34 and provided with the wrench hold 35 to permit its convenient application and removal.

The oil chamber 23 has extended therefrom a series of ducts or passages 36 inclined toward the center of the axle and passing through the extension so as to discharge into the pedestal and properly lubricate these parts. The oil chamber 23 is fed from the reservoirs 37 disposed at opposite sides and between the wheel spokes 22 and thus being in communication with the chamber by means of the passage 38 leading thereto. Each of the boxes is provided with an opening 39 which is normally closed by the flanged cap 40. This cap is mounted upon a spring plate 41 provided with the finger hold 42 at one end and secured at its opposite end to the wall of the reservoir by means of the bolt 43 or other desired means so as to retain the cap under constant tension to prevent leakage at the opening 39 which opening is also provided with the packing or gasket 44 to prevent leakage at that point.

In the operation of the invention, it will be seen that the wheel may be readily applied to the axle and secured against longitudinal movement thereon by means of the keys which are supported upon the bolts out of contact with the axle and cutting and wear thereof by the key is entirely avoided as the key is pivotally mounted upon its bolt. The construction and arrangement of the oil chamber provides for the thorough lubrication of the axle at all times and also a feed of oil to the pedestal, escape of which is effectually prevented by the packings, the outer one of which surrounds the wheel extension, and the oil passage therefrom discharges within the pedestal. The construction and arrangement of the reservoirs with the spring closing caps thereof permits a continuous feed to the oil chamber and prevents escape from the boxes while permitting the convenient refilling thereof whenever desired. The invention therefore presents a simple, very efficient and economical construction for attaching a wheel to the axle and lubricating these parts in the use of the invention.

Having described my invention and set forth its merits, what I claim and desire to secure by Letters Patent is:—

1. In a device of the class described, an axle, a pedestal mounted thereon and provided with a lubricating space, a wheel having its hub formed with an oil chamber therein, an extension from said hub entering said pedestal and provided with a passage leading from the oil chamber and discharging at its end within the pedestal.

2. In a device of the class described, an axle, a pedestal mounted thereon and provided with a lubricating space, a wheel having its hub formed with an oil chamber therein, an extension from said hub entering said pedestal and provided with a passage leading from the oil chamber and discharging at the lubricating space within the pedestal, and a fabric packing disposed at the opposite ends of said pedestal one of which surrounds said extension.

3. In a device of the class described, an axle, a pedestal mounted thereon and provided with a lubricating space, a wheel having its hub formed with an oil chamber therein, an extension from said hub entering said pedestal and provided with a passage leading from the oil chamber to the pedestal, a fabric packing disposed at the opposite ends of said pedestal one of which surrounds said extension, and oil reservoirs carried by the wheel at opposite sides of said oil chamber and communicating therewith.

4. In a device of the class described, an axle, a pedestal having a bearing surface therein and lubricating space communicating therewith, a wheel having its hub provided with an oil chamber, and an extension laterally from said hub provided with an oil passage from said chamber discharging at the end of the hub within said pedestal opposite said space.

5. In a device of the class described, an axle, a pedestal having a bearing and lubricating space communicating therewith, a wheel having its hub provided with an oil chamber, an extension laterally from said hub provided with a passage communicating with said space, a fabric packing disposed within the pedestal and surrounding said hub extension, and a reservoir communicating with the oil chamber in said hub.

In testimony whereof I affix my signature in presence of two witnesses.

JOHN H. RUTHERFORD.

Witnesses:
 SAM K. RUTHERFORD,
 L. J. MARLIN.